United States Patent
Wu et al.

(10) Patent No.: US 9,712,807 B2
(45) Date of Patent: Jul. 18, 2017

(54) DISPARITY DETERMINATION FOR IMAGES FROM AN ARRAY OF DISPARATE IMAGE SENSORS

(71) Applicant: INTEL CORPORATION, Santa Clara, CA (US)

(72) Inventors: Yi Wu, San Jose, CA (US); Jiang Yong, Shanghai (CN)

(73) Assignee: Intel Corporation, Santa Clara, CA (US)

(*) Notice: Subject to any disclaimer, the term of this patent is extended or adjusted under 35 U.S.C. 154(b) by 249 days.

(21) Appl. No.: 14/542,040

(22) Filed: Nov. 14, 2014

(65) Prior Publication Data

US 2016/0071279 A1 Mar. 10, 2016

Related U.S. Application Data (60) Provisional application No. 62/047,191, filed on Sep. 8, 2014.

(51) Int. Cl.
| | |
|---|---|
| H04N 13/02 | (2006.01) |
| G06T 3/40 | (2006.01) |
| H04N 13/00 | (2006.01) |
| G06T 7/00 | (2017.01) |

(52) U.S. Cl.
CPC .......... *H04N 13/0242* (2013.01); *G06T 3/40* (2013.01); *G06T 7/97* (2017.01); *H04N 13/0022* (2013.01)

(58) Field of Classification Search
None
See application file for complete search history.

(56) References Cited

U.S. PATENT DOCUMENTS

| | | | |
|---|---|---|---|
| 6,856,314 B2* | 2/2005 | Ng | G06K 9/20 345/419 |
| 7,031,512 B2* | 4/2006 | Ng | G06K 9/20 345/422 |
| 2006/0029272 A1* | 2/2006 | Ogawa | G06K 9/32 382/154 |
| 2014/0063188 A1* | 3/2014 | Smirnov | H04N 13/0018 348/43 |

* cited by examiner

*Primary Examiner* — Dakshesh Parikh
(74) *Attorney, Agent, or Firm* — Blakely, Sokoloff, Taylor & Zafman LLP (57) ABSTRACT

Disparity is determined for images from an array of disparate image sensors. In one example, a method includes processing images from multiple cameras of a camera array to reduce variations caused by variations in the in the image sensors of the respective cameras, the multiple cameras including a reference camera and at least one secondary camera, and determining multiple baseline disparities from the image from the reference camera to the images from the secondary cameras.

20 Claims, 5 Drawing Sheets

DISPARITY DETERMINATION FOR IMAGES FROM AN ARRAY OF DISPARATE IMAGE SENSORS

CLAIM OF PRIORITY

This application claims the benefit of U.S. Provisional Application No. 62/047,191 filed Sep. 8, 2014, which is hereby incorporated by reference.

FIELD

The present description relates to calculating disparity between images from an array of image sensors.

BACKGROUND

Small digital cameras have become commonplace on portable telephone, communication, entertainment, and media devices. There is a corresponding increase in the use of cameras for security, navigation, safety, and other uses. Two cameras directed at the same scene from different positions provide stereo vision allowing for depth perception. The accuracy of the depth perception can be improved using more than two different cameras. An array of cameras or image sensors mounted to a single device can also enable many other compelling 3D user experiences, including temporal resolution and increased dynamic range. A variety of different portable photographic, computing, and media player devices can be adapted to integrate camera array technology on their platforms.

Image disparity refers to the difference in the visual direction of two or more points in space. Pixel correspondences and disparity are used in a variety of 3D computer vision applications, e.g., 3D depth reconstruction, 3D object segmentation, 3D object detection and tracking, view interpolation, super-resolution, etc.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A general framework of image disparity estimation is described for a camera array. This framework does not require that the cameras be the same nor that the cameras be in any particular position with respect to each other. Removing any requirements to use the same camera module and to use symmetric camera position allows the cost to be reduced and allows more freedom in designing the overall device. In addition, by using different types of sensors, additional capabilities may be added, by adding specialized image sensors for e.g. infrared, low light and other image information. Any camera sensor and any layout may be used.

Figure 1:
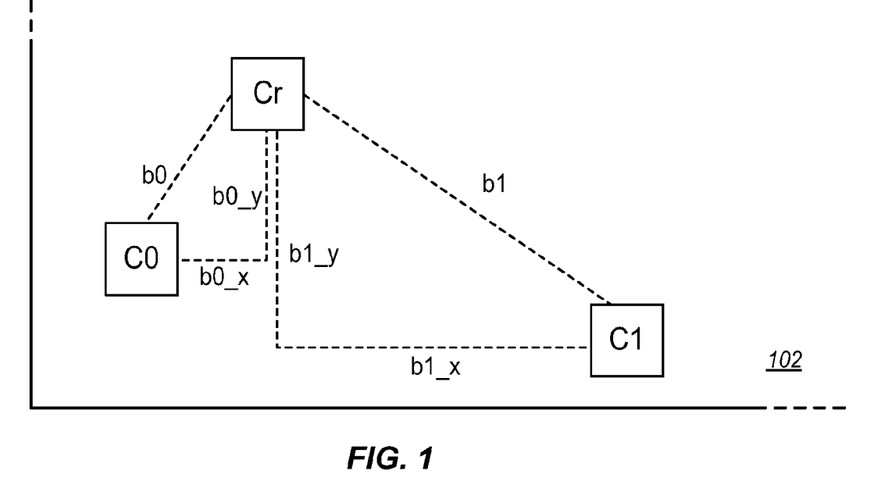
FIG. 1 is a diagram of a layout of three image sensors according to an embodiment.

FIG. 1 is a diagram of a layout of three cameras on a single surface of a device 102. The device has an exterior housing shown as the surface of FIG. 1. The cameras are mounted in a typically fixed position on the surface. The cameras may be near a display, such as a touchscreen display, microphones, speakers and other components on the device. The cameras may be oriented on a front side or a back side of the device and may be oriented toward a user or away from the user. There may a camera on one or more surfaces of the device.

A reference camera Cr is used as the reference point for the position of the other two cameras C0, C1. There may be more or fewer other cameras. The second camera C0 is a specific distance b0 from the reference camera Cr. This distance may be in any direction from the position of the reference camera and has a vertical component b0_y and a horizontal component b0_x. Similarly, the third camera C1 is a distance b1 from the reference camera. This distance is illustrated as but is not necessarily in a different direction from the reference camera as compared to the second camera. This distance also has a vertical component b1_y and a horizontal component b1_x. Any number of additional cameras may be identified with reference to the position of the reference camera. As shown, the distances b0, b1 are not necessarily equal and the vertical and horizontal components of these distances are also not necessarily equal. Accordingly, the camera array is asymmetrical. As described herein, disparity may be determined between any number of cameras in symmetrical or asymmetrical arrays.

A new framework of disparity estimation is described with three basic groups of operations. These are shown as a sequence of operational modules in FIG. 2. The modules may perform the described operations in hardware, in firmware, or in software, and the modules may be implemented in different processing stages or using a single processing stage. The operational modules may be integrated into a single image signal processor (ISP) or in several different processing systems. The framework receives an input image 203 from each camera and an identification of the corresponding camera. The images may be part of a sequence of images as in a video captured by all three cameras. The images are rectified and may be processed for noise, distortion, and other artifacts.

The input images are rectified in a previous operational module or in the cameras to simplify the process of determining inter-image position correspondences, by enabling searches for corresponding positions to be confined along epipolar lines. The rectification is typically done by rotationally transforming the captured images based on reference points taken from the corresponding image from the reference camera.

Figure 2:
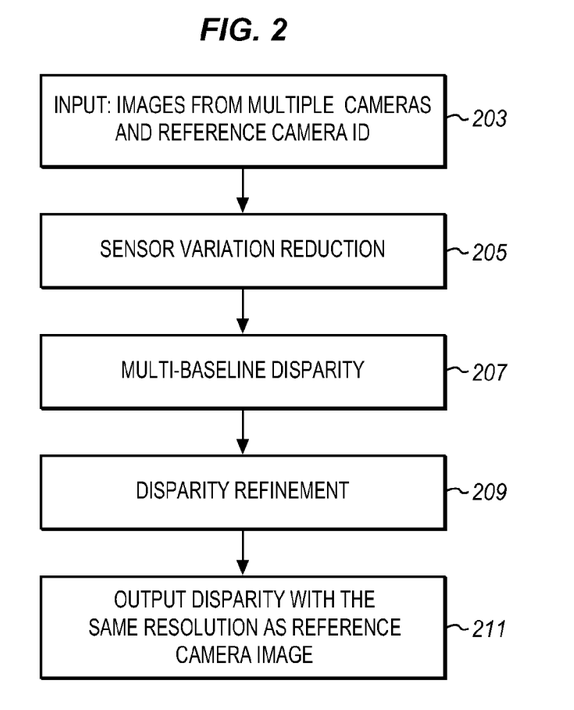
FIG. 2 is a process flow diagram of estimating disparity between images according to an embodiment.

At the first module 205 images from multiple cameras are processed to reduce sensor variation. The system reduces the variation of images from the sensors in terms of resolution, color characteristics, noise patterns, etc. At the second module 207 a multi-baseline disparity is determined from the reference camera to each of the other cameras in the array.

The horizontal baseline, b0_x, b1_x, may be described as the distance between the horizontal location of the reference camera Cr and the horizontal location of other cameras C0, C1. Similarly the vertical baseline, b0_y, b1_y, may be described as the distance between the vertical location of the reference image Cr and the vertical location of the other cameras C0, C1. The multi-baseline disparity calculation takes both the horizontal and the vertical into consideration.

The system matches the reference camera image with the other images. The cameras from the other image may be located in any distance and any direction whether horizontal, vertical, or diagonal. At the third module 209 the disparity output is refined to get cleaner and smoother disparity results. The system increases the robustness of the image match to improve the quality of an image disparity result. The output 211 of this framework is an image disparity that may be passed to other modules for use in other operations. This output may have the same resolution as the reference camera even if the secondary camera has a different resolution.

As described below, the camera array may have any spatial layout. Any camera may be used as the reference camera. The disparity is calculated based on comparing the reference camera to each of the other cameras individually and aggregating them using the multi-baseline mechanism. There is one set of disparity values for each secondary camera image. The choice of reference camera is not important. Any camera may serve as the reference camera. The other cameras need not be located on a horizontal and vertical baseline with respect to the reference camera.

Figure 3:
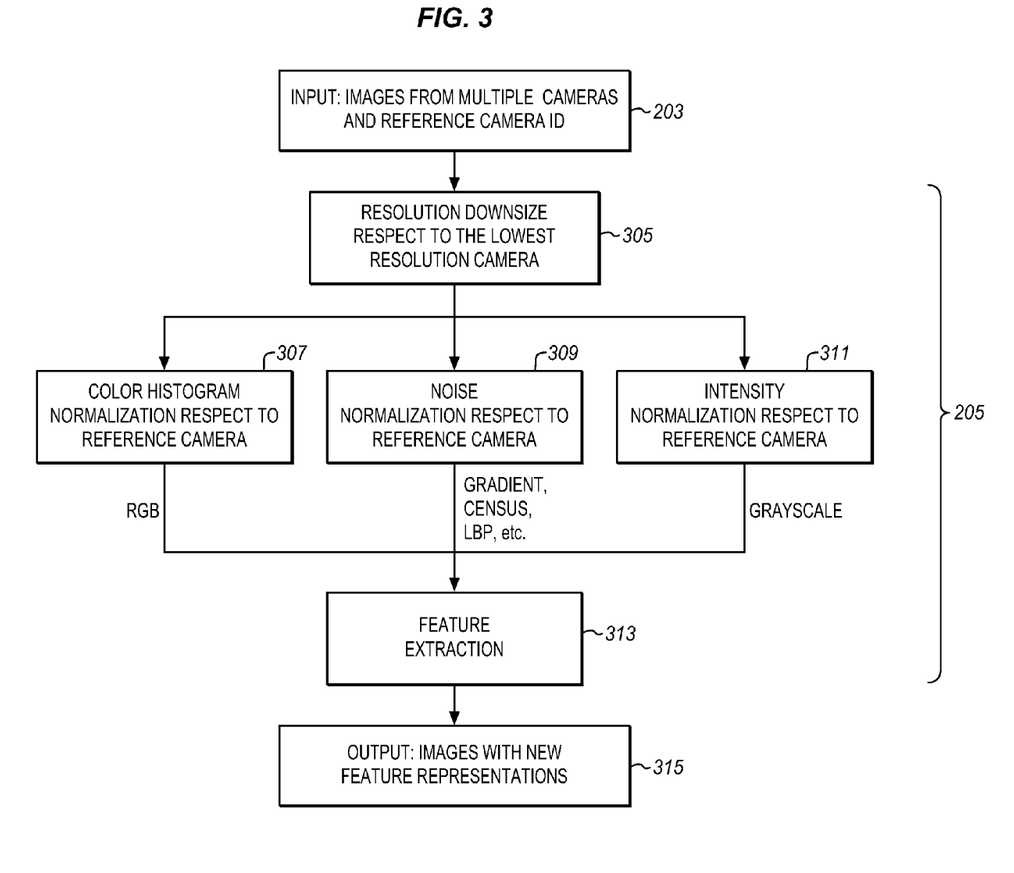
FIG. 3 is a process flow diagram of reducing sensor variations according to an embodiment.

FIG. 3 is an expanded view of the operations performed by sensor variation reduction module 205 of FIG. 2. The sensor variation reduction may include the four stages as shown or there may be more or fewer stages, depending on the implementation.

A hybrid camera array poses technical difficulties in matching images from different types of sensors (different resolutions, color characteristics, noise patterns, etc.). This can be simplified by first determining the lowest resolution of all the images and then downsizing 305 the other images to the resolution of the lowest resolution camera. By doing that, all images have the same resolution and a pixel-to-pixel correspondence search can efficiently be performed in a disparity calculation module. The images may then be transformed to a new features representation.

Since the color characteristics, noise patterns, etc. may be very different for different cameras or different image sensors, the disparity determinations are improved by reducing variances caused by other aspects of the camera. The variance may be reduced based on the features that are going to be extracted to represent the images. FIG. 3 presents three alternative normalization operations 307, 309, 311, that may be performed to reduce the variances in the images. Other variance reduction operations may be performed instead or in addition, depending on how the disparity is to be determined. Alternatively, several different disparity estimations may be performed so that one or more different variance reduction operations are performed for each estimate. As an example, one path may use noise normalization and a separate parallel path (not shown) may use intensity normalization.

In the first example, if RGB (Red Green Blue) color is used to represent features, then a color histogram normalization module 307 may be used to match images to the same color characteristics as the reference camera. If grayscale is used to represent features, then an intensity histogram normalization module 311 may be used to match images to the same intensity characteristics as the reference camera. Features such as gradient, census, and LBP (Local Binary Pattern) are less sensitive to color variations, but sensitive to noise. If these features are used then a noise normalization module 309 may be used to match images to the same noise characteristics as the reference camera.

After the variations are reduced, then a feature extraction module 313 is applied to the resulting downscaled, normalized images. The result is a set of images with representations of the feature that will be used for estimating the disparities 315.

Figure 4:
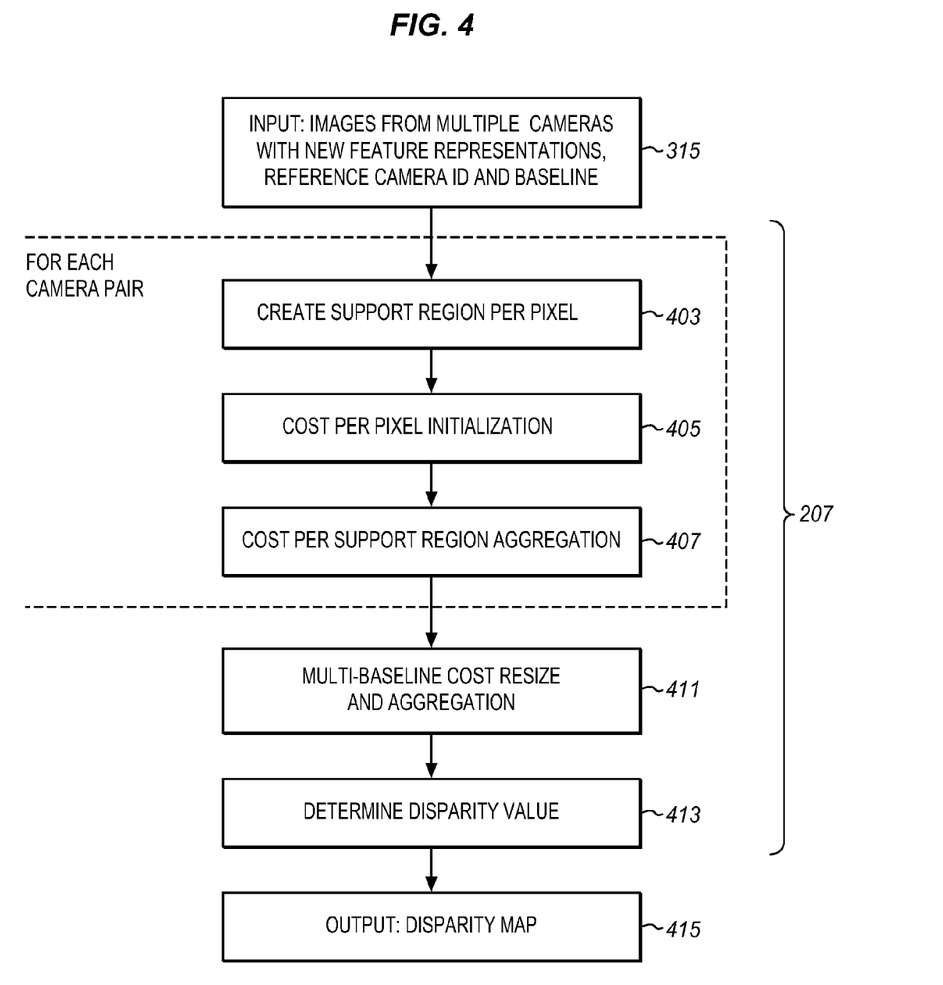
FIG. 4 is a process flow diagram determining a baseline for multiple image disparities according to an embodiment.

Once features are extracted, a multi-baseline disparity process 207 may be performed as shown in the process flow diagram of FIG. 4. FIG. 4 is an expanded view of operations performed by the multi-baseline disparity module. The input from the sensor variation reduction 205 is images from multiple cameras with new feature representations, the reference camera ID and the baseline.

The disparity calculations are performed on image pairs. The image from each secondary camera is compared to the corresponding processed image from the reference camera. At 403, a support region is created on a per-pixel basis. An adaptive shape support region may be used for accurate disparity estimates. At 405, a cost per pixel is initialized. For each pair of camera images Cr and Ci, a pixel-wise absolute difference is taken using features at each candidate disparity d. At 407, the cost per support region is aggregated, i.e. for each pair of cameras Cr and Ci, the absolute difference errors are aggregated.

After finishing all the pairwise processes, at 411 all the pairwise SAD (Sum of Absolute Differences) error costs are resized with respect to the SAD with the longest baseline and then aggregated. This allows a multi-baseline disparity value to be determined at 513 for a given pixel (x, y) in the reference camera along the longest baseline. The result is then a disparity map which provides a value for each pixel.

Considered in more detail, the shape support regions are adaptive. An adaptive shape will provide higher accuracy for the disparity estimates than a fixed size region or fixed window shape. The adaptive shape is determined so that the pixels used for a sum of absolute differences (SAD) calculation all have the same depth. A fixed window size can produce inaccuracies at low texture neighborhoods and at depth discontinuity areas.

To find 403 the adaptive shape support region, each pixel (x, y) is extended in four directions (left, right, up and down) until it hits a pixel for which the value for the selected feature, e.g. color, gradient or grayscale, exceeds a threshold difference. In other words, the feature value for the selected pixel is compared to the feature value for each pixel in each direction until the difference exceeds a threshold. This walk through the image features for the pixels can be also be described as follows: for each pair of images from two different cameras (Cr, the reference camera, and Ci, the secondary camera), and for each candidate disparity $d=(d_x, d_y)$, where $d_x$ and $d_y$ are the candidate disparity in the horizontal and vertical directions, respectively, that is calculated using the baseline ratio $d_x=d*bi\_x/bi$ and $d_y=d*bi\_y/bi$, where bi is the baseline distance from the reference camera and the $i^{th}$ camera and bi_x, bi_y are the horizontal and vertical baseline distances from the reference camera to the $i^{th}$ camera, respectively, a support region is constructed for each pixel (x, y) in Cr and corresponding comparing pixel $(x+d_x, y+d_y)$ in Ci. Finally, the support region S of pixel (x, y) in Cr at disparity d is the overlapped region of all (Cr, Ci) pairs. The process is repeated to construct support regions for all of the pixels of the reference camera image.

The cost function 405 is determined for each pair of images from the respective primary Cr and secondary camera Ci. A pixel-wise absolute difference (AD) is initialized using features at each candidate disparity d. Equation 1 is a relation for determining an AD for each pixel (x,y) as a function of the disparity $$AD_i(d)=|I_r(x,y)-I_i(x+d_x,y+d_y)|\qquad\text{Eq. 1}$$

where $I_r$ and $I_i$ refer to image features of Cr and Ci, respectively.

The aggregation function 407 is performed for each respective image pair from the primary Cr and secondary Ci camera. The AD errors are aggregated using a sum of absolute differences (SAD) over all pixels in each support region S of pixel (x y) of reference camera at disparity d. Integral image techniques may be used to improve the efficiency of the calculation. This is shown in Equation 2.

$$SAD_i(d)=\Sigma|I_r(x+k,y+t)-I_i(x+k+d_x,y+t+d_y)|\qquad\text{Eq. 2}$$

where the sum over all $(k,t) \in S_{i,r}(d)$, where $S_{i,r}(d)$ is the support region of pixel (x,y).

The resize and aggregate function 411 is used to resize all the pairwise SAD error costs between images of each pair to the longest baseline based on a baseline ratio using bilinear interpolation. The error costs are then aggregated together using an aggregate function. The aggregate function may be for example a $SAD_i(d)$ with the minimum error or an average of a subset of $\{SAD_i(d)\}$ with the minimum error. The resizing and aggregation is represented in Equation 3.

$$E(d)=\text{aggregate }(SAD_i^{resized}(d))\qquad\text{Eq. 3}$$

where E(d) is the aggregate error.

Finally, the multi-baseline disparity value for a given pixel (x, y) in the reference camera along the longest baseline is calculated by finding the minimum d in the summarized error map from all camera pairs $$d(x,y)=\text{argmin}_d E(d)\qquad\text{Eq. 4}$$

The disparity from Eq. 1 might still contain noise. In order to get a cleaner and smoother disparity output, a refinement step may be used to remove noise and low confident disparity values. In the described framework, methods such as the uniqueness of global minimum cost, variance of the cost curve, etc. have been used. Using these determinations, median filter, joint bilateral filter, etc., have already been calculated and may easily be used to fill holes that were removed in the previous disparity calculation operations. In addition, if the disparity map's resolution is lower than the original resolution of the reference camera image, the disparity map may be upscaled to the same resolution as that of the reference camera.

Figure 5:
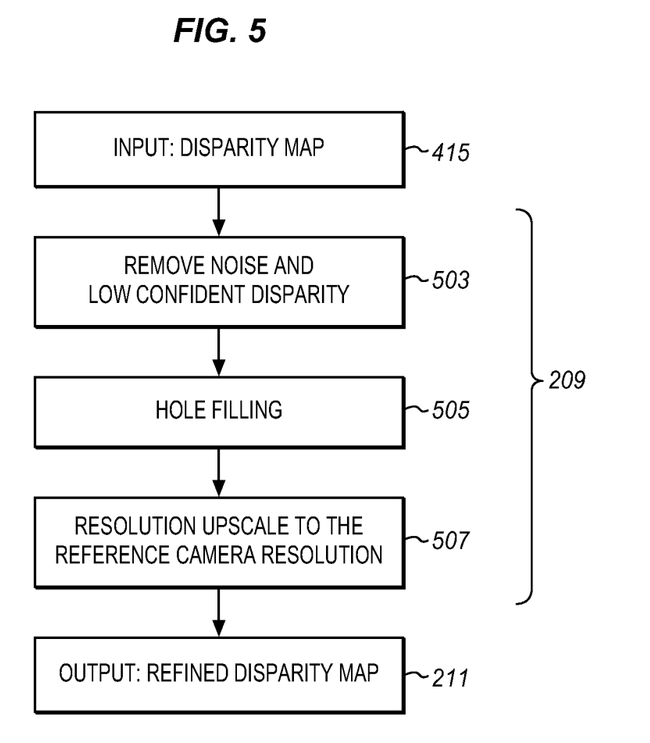
FIG. 5 is a process flow diagram of refining the disparity for the multiple images according to an embodiment.

FIG. 5 is an expanded view of operations performed by the disparity refinement module 209. The disparity map 415 is provided as an input. The refinement operations include removing noise and low confidence disparities 503. Next, holes in the images are filled 505 using neighboring or mean values. Finally the resolution is upscaled 507, if necessary to produce a refined disparity map output 211.

This technique may be used for software (especially for developing graphics and media applications) that uses array cameras. This technique may be used for hardware in consumer electronics, PC, mobile and handheld devices that use array cameras. Service providers (such as media service providers) that use camera arrays may also use this technique.

Incorporating hybrid camera array technology into a platform can enable many applications with compelling user experiences, including 3D media capture, HDR (High Dynamic Range), viewing, interaction, high-speed video, etc. on mobile, ultra-mobile, desktop and TV (Television) platforms.

A complete framework and process of calculating disparity from a hybrid array of cameras with arbitrary spatial layouts is described. This approach may be incorporated as part of a platform design. It could also be incorporated as a component into a graphics or media kit or into middleware products.

Figure 6:
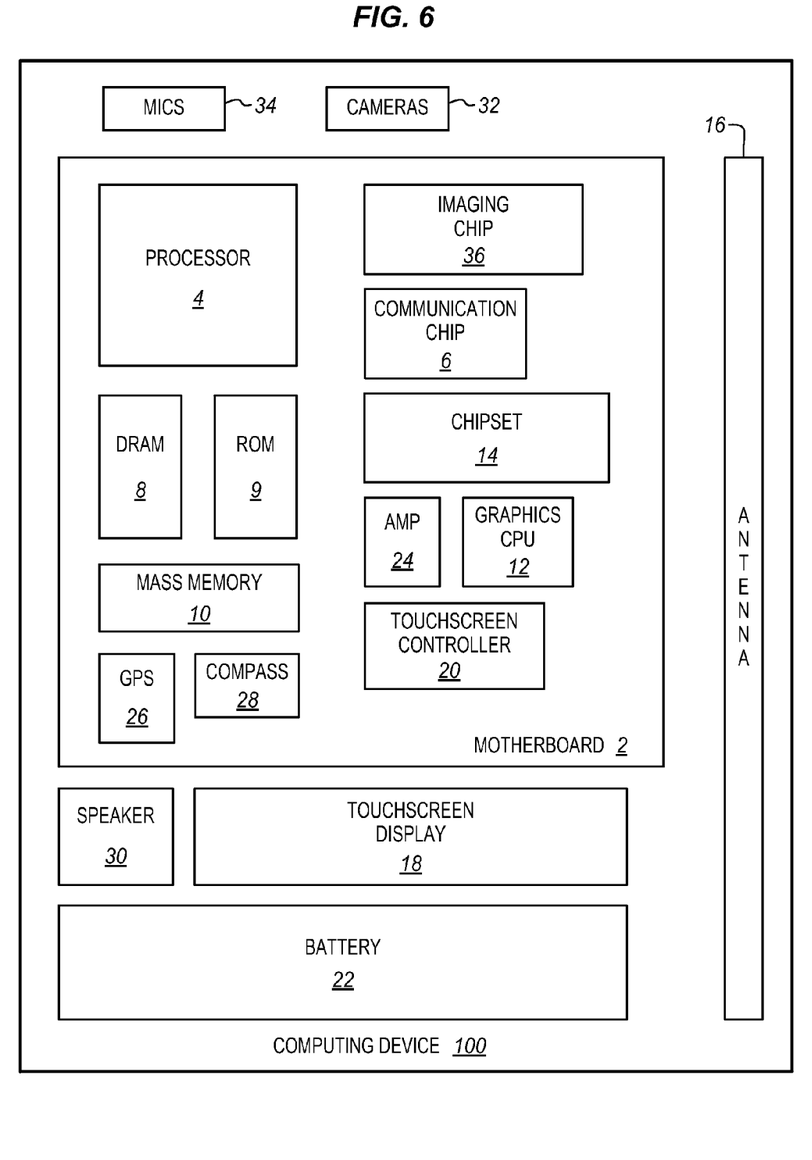
FIG. 6 is a block diagram of a computing device incorporating an image processing system with multiple cameras according to an embodiment.

FIG. 6 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera array 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The camera array may be coupled to an image chip 36 and to the processor 4, either directly or through the image chip. The image chip may take a variety of different forms, such as a graphics co-processor, a digital signal processor (DSP), an image signal processor (ISP), or any other type of separate dedicated imaging management module. Such a device or module may comprise logic, algorithms, and/or instructions operative to capture, process, edit, compress, store, print, and/or display one or more images. In some embodiments, the imaging management module may comprise programming routines, functions, and/or processes implemented as software within an imaging application or operating system. In various other embodiments, the image processing may be implemented as a standalone chip or integrated circuit, or as circuitry comprised within the processor, within a graphics chip or other integrated circuit or chip, or within a camera module. The techniques described above may be implemented in the image chip of the processor or functions may be distributed between different components which may include the cameras, image chip, processor, and other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes processing images from multiple cameras of a camera array to reduce variations caused by variations in the in the image sensors of the respective cameras, the multiple cameras including a reference camera and at least one secondary camera, and determining multiple baseline disparities from the image from the reference camera to the images from the secondary cameras.

Further embodiments include refining the disparity output for cleaner and smoother disparity results. In further embodiments processing comprises converting the images to a single resolution. In further embodiments the converting comprises downconverting at least one image to the resolution of a camera having the lowest resolution.

In further embodiments processing comprises a pair-wise pixel-to-pixel correspondence search of the images. In further embodiments processing comprises determining a features representation of the reference camera image and aligning features of the representation with features of a secondary camera image. In further embodiments, reducing variations comprises one or more of color histogram normalization, intensity histogram normalization, gradient normalization, census normalization, LBP normalization, noise normalization, etc.

In further embodiments determining uses a sum of absolute differences. In further embodiments, using a sum of absolute differences comprises, pairing the reference camera image with a secondary camera image, creating a plurality of shape support regions for the paired images on a per-pixel basis, taking a pixel-wise absolute difference using features of each shape support region, and aggregating the absolute differences.

In further embodiments taking a pixel-wise absolute difference comprises for each pair of cameras taking a pixel-wise absolute difference using features at each candidate disparity. In further embodiments aggregating comprises for each pair of cameras aggregating the absolute differences errors to produce pairwise sums of absolute difference costs. In further embodiments determining comprises resizing all the pairwise sums of absolute difference error costs with respect to a selected reference sum of absolute difference error costs.

In further embodiments the selected reference sum of absolute difference error costs is the one with the longest baseline. In further embodiments calculating comprises calculating a multi-baseline disparity value for a given pixel in the reference camera along the longest baseline.

Some embodiments pertain to a machine-readable medium having instructions stored thereon that when executed by the machine cause the machine to perform operations that include processing images from multiple cameras of a camera array to reduce variations caused by variations in the in the image sensors of the respective cameras, the multiple cameras including a reference camera and at least one secondary camera, and determining multiple baseline disparities from the image from the reference camera to the images from the secondary cameras.

In further embodiments the instructions for processing comprise instructions for converting the images to a single resolution by downconverting at least one image to the resolution of a camera having the lowest resolution. In further embodiments the instructions for determining comprise instructions for taking a pixel-wise absolute difference using features at each candidate disparity and aggregating the absolute differences errors to produce pairwise sums of absolute difference costs.

Some embodiments pertain to a portable device that includes a surface of the device, a plurality of cameras formed in an asymmetrical array on the surface, each camera having an image sensor to produce an image, the multiple cameras including a reference camera and at least one secondary camera, and an image signal processor to receive the images from the cameras and to process the images to reduce variations caused by variations in the in the image sensors of the respective cameras, and to determine multiple baseline disparities from the reference camera image to the images from the secondary cameras.

In further embodiments the processing includes a pairwise pixel-to-pixel correspondence search of the images. In further embodiments the determining includes determining pairwise sums of absolute difference error costs between the reference camera image and the secondary camera images using features at candidate disparities and selecting a multi-baseline disparity value for a given pixel in the reference camera image corresponding to the disparity with the lowest cost.

What is claimed is:

1. A method comprising:
processing images from multiple cameras of a camera array to reduce variations caused by variations in the image sensors of the respective cameras, the multiple cameras including a reference camera and at least one secondary camera, the processing including normalizing pixel values of the secondary camera with respect to the reference camera;
determining multiple baseline disparities from the images from the reference camera to the images from the secondary cameras; and
generating disparity maps which provide disparity values for pixels of the images from the reference camera.

2. The method of claim 1, further comprising refining the disparity output for cleaner and smoother disparity results.

3. The method of claim 1, wherein processing comprises converting the images to a single resolution.

4. The method of claim 3, wherein the converting comprises downconverting at least one image to the resolution of a camera having the lowest resolution.

5. The method of claim 3, wherein processing comprises a pair-wise pixel-to-pixel correspondence search of the images.

6. The method of claim 1, wherein processing comprises determining a features representation of the reference camera image and aligning features of the features representation with features of a secondary camera image.

7. The method of claim 1, wherein normalizing comprises color histogram normalization, intensity histogram normalization, or noise normalization.

8. The method of claim 1, wherein determining uses a sum of absolute differences.

9. The method of claim 8, wherein using a sum of absolute differences comprises:
pairing the reference camera image with a secondary camera image;
creating a plurality of shape support regions for the paired images on a per-pixel basis;
taking a pixel-wise absolute difference using features of each shape support region; and
aggregating the pixel-wise absolute differences.

10. The method of claim 9, wherein taking a pixel-wise absolute difference comprises for each pair of cameras taking a pixel-wise absolute difference using features at each candidate disparity.

11. The method of claim 10, wherein aggregating comprises for each pair of cameras aggregating absolute difference errors to produce pairwise sums of absolute difference costs.

12. The method of claim 11, wherein determining comprises resizing all the pairwise sums of absolute difference error costs with respect to a selected reference sum of absolute difference error costs.

13. The method of claim 12, wherein the selected reference sum of absolute difference error costs is the one with the longest baseline.

14. The method of claim 12, wherein calculating comprises calculating a multi-baseline disparity value for a given pixel in the reference camera along the longest baseline.

15. A non-transitory machine-readable medium having instructions stored thereon that when executed by the machine cause the machine to perform operations comprising:
processing images from multiple cameras of a camera array to reduce variations caused by variations in the image sensors of the respective cameras, the multiple cameras including a reference camera and at least one secondary camera, the processing including normalizing pixel values of the secondary camera with respect to the reference camera; and
determining multiple baseline disparities from the images image from the reference camera to the images from the secondary cameras; and
generating disparity maps which provide disparity values for pixels of the images from the reference camera.

16. The medium of claim 15, wherein the instructions for processing comprise instructions for converting the images to a single resolution by downconverting at least one image to the resolution of a camera having the lowest resolution.

17. The medium of claim 15, wherein the instructions for determining comprise instructions for taking a pixel-wise absolute difference using features at each candidate disparity and aggregating the absolute differences errors to produce pairwise sums of absolute difference costs.

18. A portable device comprising:
a surface of the device;
a plurality of cameras formed in an asymmetrical array on the surface, each camera having an image sensor to produce an image, the multiple cameras including a reference camera and at least one secondary camera, the secondary camera having an image sensor that is different from the reference camera; and
an image signal processor to receive the images from the cameras and to process the images to reduce variations caused by differences between the image sensors of the respective cameras, the processing including normalizing pixel values of the secondary camera with respect to the reference camera, to determine multiple baseline disparities from the reference camera images to the images from the secondary cameras, and to generate disparity maps which provide disparity values for pixels of the images from the reference camera.

19. The device of claim 18, wherein the processing includes a pair-wise pixel-to-pixel correspondence search of the images.

20. The method of claim 18, wherein the determining includes determining pairwise sums of absolute difference error costs between the reference camera image and the secondary camera images using features at candidate disparities and selecting a multi-baseline disparity value for a given pixel in the reference camera image corresponding to the disparity with the lowest cost.

* * * * *